United States Patent [19]
Lee

[11] Patent Number: 5,632,546
[45] Date of Patent: May 27, 1997

[54] MULTIPURPOSE PROJECTOR WITH DETACHABLE PROJECTING UNIT

[75] Inventor: Seung G. Lee, Seoul, Rep. of Korea

[73] Assignee: LG Electronics Inc., Seoul, Rep. of Korea

[21] Appl. No.: 577,225

[22] Filed: Dec. 22, 1995

[30] Foreign Application Priority Data

Dec. 24, 1994 [KR] Rep. of Korea ............. 36519/1994

[51] Int. Cl.⁶ ................................................. G03B 21/14
[52] U.S. Cl. ............................ 353/122; 353/82; 353/87
[58] Field of Search ........................ 353/119, 82, 87, 353/DIG. 3, 122

[56] References Cited

U.S. PATENT DOCUMENTS

| | | | |
|---|---|---|---|
| 5,090,800 | 2/1992 | Ushiro | 353/119 |
| 5,325,137 | 6/1994 | Konno et al. | 353/DIG. 3 |
| 5,467,152 | 11/1995 | Wilson et al. | 353/DIG. 3 |
| 5,477,284 | 12/1995 | Taylor et al. | 353/DIG. 3 |

*Primary Examiner*—William Dowling
*Attorney, Agent, or Firm*—John P. White

[57] ABSTRACT

Multipurpose projector having a detachable projecting unit including a body having a sheet of transparent glass disposed in the top part thereof and an attaching recess at one side of an optical system region therein; a projecting unit attachable into the attaching recess or disposable right over the transparent glass by means of rotatable post attached to the body at the user's option; a liquid crystal display projector part having a light source disposed movably in a vertical direction in rear part of the optical system in the body, a first focusing lens for focusing the light emitted from the light source, a liquid crystal panel for receiving light focused by the first focusing lens, and a zoom lens; an overhead projector part disposed in the optical system in the body having a second focusing lens, a plurality of total reflection mirrors for deflecting a path of the light focused by the second focusing lens at a right angle from a horizontal direction to a vertical direction, and a Fresnel lens detachably disposed in the body for focusing the light deflected into the vertical direction at the total reflection mirrors; and an image sensor disposed in the rear part of a projecting lens in the liquid crystal display part. Such a projector allows still image projection, moving picture projection, print copying and image copying, at the user's option.

14 Claims, 7 Drawing Sheets

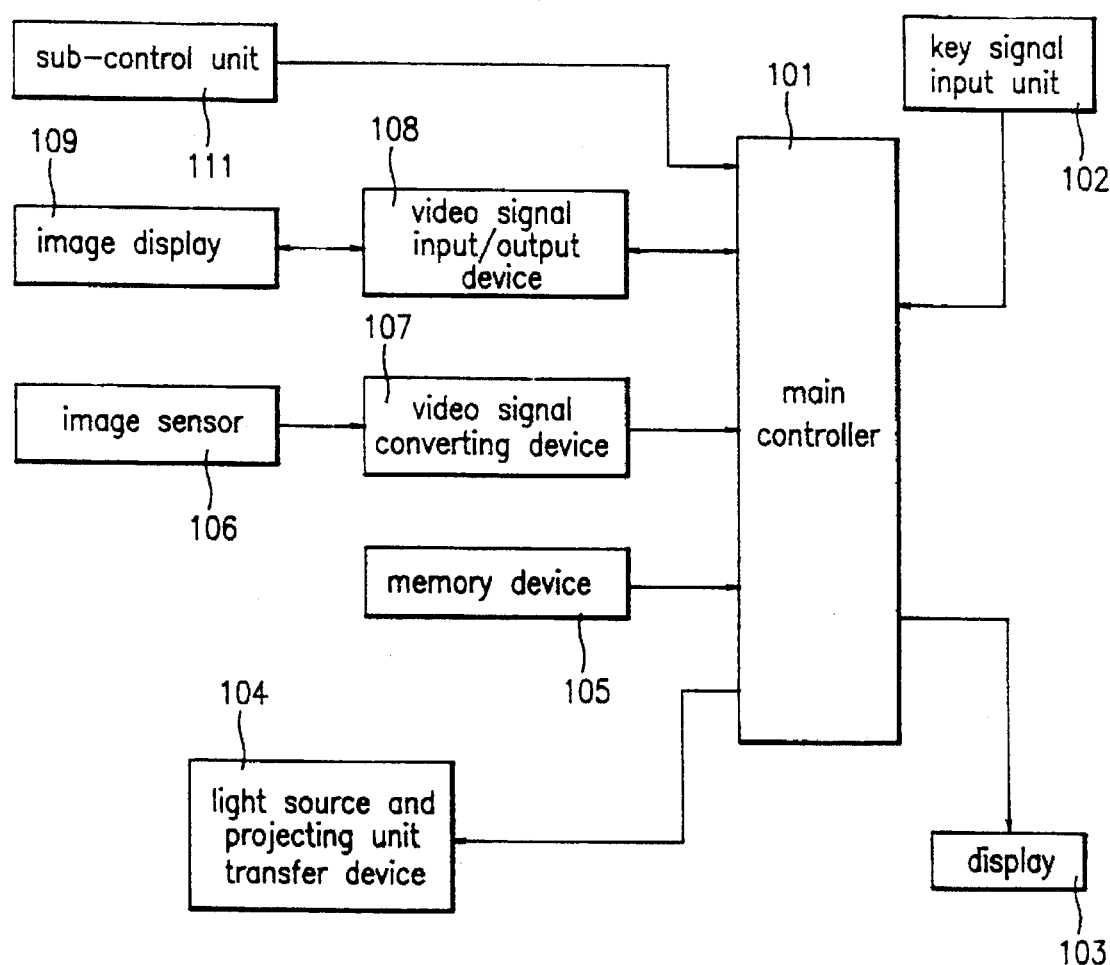

MULTIPURPOSE PROJECTOR WITH DETACHABLE PROJECTING UNIT

BACKGROUND OF THE INVENTION

The present invention relates to a multipurpose projector, more particularly to a multipurpose projector with a detachable projecting unit adapted to be detachable from a zoom lens and an image sensor in an optical system for carrying out multipurpose functions of an overhead projector (OHP) which projects a still image onto a screen, an LCD projector which projects moving pictures onto the screen, and a print copier and image copier, according to selection on a menu.

Conventional OHPs which project a still image onto a screen, include a pass-through type OHP as shown in FIG. 1 and a reflection type OHP as shown in FIG. 2. The projecting process of each will be explained in detail.

Upon turning on the projector after placing a transparent film of a still image on a Fresnel lens 22 in top of a body 21 of the projector, light from a light source is reflected at a reflection mirror to the Fresnel lens 22, and focused by the Fresnel lens 22 onto a projecting unit 23. Then, the still image is projected to a projecting mirror 24 with the image diverged, and therefrom reflected onto a screen (not shown) in front of the projecting mirror 24.

This projecting process explained herein is the same for the pass-through type OHP and the reflection type OHP, except that the pass-through type OHP has its light source and the reflection mirror inside of the body 21 while the reflection type OHP has them inside of the projecting unit 23.

Such OHPs can only project a still image onto a screen, with inconvenience of continuous replacement of the transparent films of still images.

A process of projecting moving pictures onto the screen, of a conventional LCD (Liquid Crystal Display) projector that projects moving pictures onto the screen having a system as shown in FIGS. 3 and 4, will be explained in detail.

The optical system of the LCD projector shown in FIG. 4 is disclosed in the Korean Patent application No. 94-23428 with a title "Combined slide and picture projector", applied for by the same applicant.

Upon turning on the LCD projector after connecting the projector to a VCR (Video Cassette Recorder) or a PC (Personal Computer), a signal separated into three color signals of red, green and blue coming from the VCR or the PC individually enters into a relevant liquid crystal panel of a first, second, and third liquid crystal panels 32, 33 and 34 disposed in the body 31 and on the same time a light source 35 generates three colored(red, green, and blue) lights. The three colored light, absorbed of its heat as it is filtered through a filter 36, is incident to a first reflection mirror 37 which is adapted to reflect red light only, and reflected at a right angle with the path of the red light. The remaining green and blue lights pass through the first reflection mirror 37 unchanged and then are incident to a second reflection mirror 38 which is adapted to reflect green light only. The green light is reflected at a right angle with the path of the green light, while the blue light passes through the mirror 38 as it was.

In the meantime, the red light reflected at the first reflection mirror 37 is reflected again at a right angle at a third reflection mirror 39, to pass through the first liquid crystal panel 22. At this time, a red image from the first liquid crystal panel 32 is carried by the red light passing through the panel 32 and is then incident to a fourth reflection mirror 40 which is adapted to reflect red color at a right angle.

And, the blue light passed through the second reflection mirror 38 is incident to a fifth reflection mirror 41 and a sixth reflection mirror 42 in series, which change its path at right angles, and passes the third liquid crystal panel 34. At this time, a blue image from the third liquid crystal panel 34 is carried by the blue light passing through the panel 34, then incident to a seventh reflection mirror 43 which is adapted to reflect blue color at a right angle.

And, the green light reflected at the second reflection mirror 38 passes through the second liquid crystal panel 33. At this time, a green image from the second liquid crystal panel 33 is carried by the green light passing through the panel 33 and is then incident to the fourth reflection mirror 40 which only reflects red color and the seventh reflection mirror 43 which only reflects blue color to pass them unchanged.

Then, the red image having its path changed at a right angle on incidence to the fourth reflection mirror 40, the blue image having its path changed at a right angle on incidence to the seventh reflection mirror 43, and the green image having been incident to the fourth reflection mirror 40 which only reflects red color and the seventh reflection mirror 43 which only reflects blue color to pass them unchanged, are combined as they pass through a projecting lens 44 in the front side of the body 31 and projected onto a screen (not shown).

Though such a conventional LCD projector has a capability of projecting moving pictures, it has a problem in that it can not be used in overhead projection and also for other purposes, such as print copying and image copying, at all. Moreover, unlike with an OHP, the conventional LCD projector has a problem in that an image from the projector can not be selected for pointing a part on the image.

In conclusion, since aforementioned OHP and LCD projector can only be used for their inherent functions, consumers must purchase projectors having a desired function individually as the case demands.

SUMMARY OF THE INVENTION

The object of the present invention is to provide a multipurpose projector having a detachable projecting unit, which is adapted to carry out multipurpose functions of an OHP which projects a still image onto a screen, an LCD projector which projects moving pictures onto the screen, and print copying as well as image copying, to the option of a user.

Another object of the present invention is to provide a multipurpose projector having a detachable projecting unit, which is versatile in use with the varied functions provided therein.

In one aspect of the present invention, there is provided a multipurpose projector having a detachable projecting unit including: a body having a sheet of transparent glass at an upper side of the body and an attaching recess which is formed at one side of an optical system region of the body; a projecting unit attachable into the attaching recess or disposable right over the transparent glass by means of a rotatable post attached to the body in response to a user's option for diverging and projecting moving pictures projected thereto; a liquid crystal display projector part having a light source disposed movably in a vertical direction in rear part of the optical system in the body for emitting lights at a predetermined luminous intensity, a first focusing lens for focusing the light emitted from the light source, a liquid crystal panel for receiving light focused by the first focusing lens for converting an electrical image received from outside into an optical image, and a zoom lens for adjusting size of the optical image converted in the liquid crystal panel; an overhead projector part disposed in the optical system in the body having a second focusing lens for focusing the light emitted from the light source, a plurality of total reflection mirrors for deflecting a path of the light focused by the second focusing lens at a right angle from a horizontal direction to a vertical direction, and a Fresnel lens detachably disposed in the body for focusing the light deflected into the vertical direction at the total reflection mirrors; and an image sensor disposed in the rear part of a projecting lens in the liquid crystal display part for converting a received optical image into an electrical image.

The multipurpose projector having a detachable projecting unit in accordance with one preferred embodiment of the present invention includes a first light dividing lens disposed in front of the liquid crystal panel in a system of the liquid crystal display projector part for dividing an image displayed on the liquid display panel in a horizontal, and vertical directions, a second light dividing lens disposed in front of the second focusing lens in a system of the overhead projector part for dividing the image divided in the vertical direction in the first light dividing lens into a horizontal, and vertical directions again, and a projecting lens disposed in front of the second light dividing lens for enlarging and projecting the image divided in the horizontal direction in the second light dividing lens.

BRIEF DESCRIPTION OF THE DRAWINGS

FIG. 9 illustrates a block diagram of the multipurpose projector having a detachable projecting unit in accordance with one preferred embodiment of the present invention.

DETAILED DESCRIPTION OF THE PREFERRED EMBODIMENT

A multipurpose projector having a detachable projecting unit in accordance with one preferred embodiment of the present invention will now be explained in detail with reference to the attached drawings.

Figure 1:
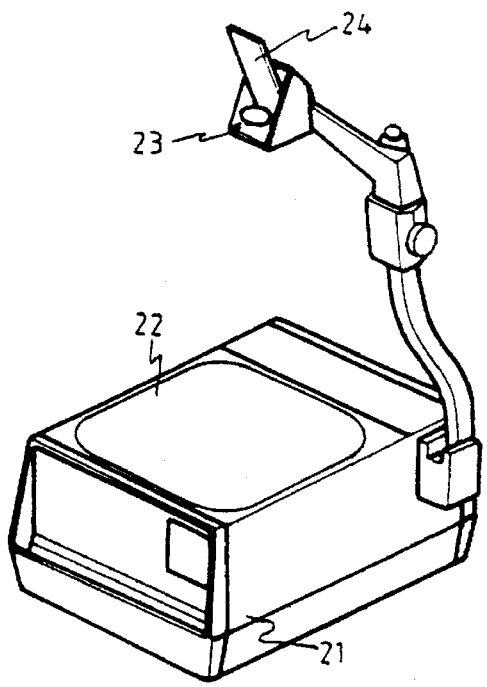
FIG. 1 illustrates a perspective view of a conventional pass-through type overhead projector.
Figure 2:
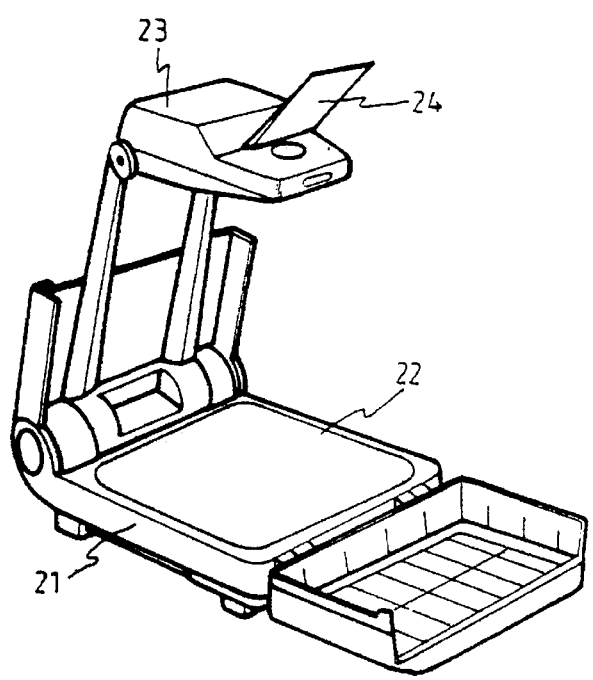
FIG. 2 illustrates a perspective view of a conventional reflection type overhead projector.
Figure 3:
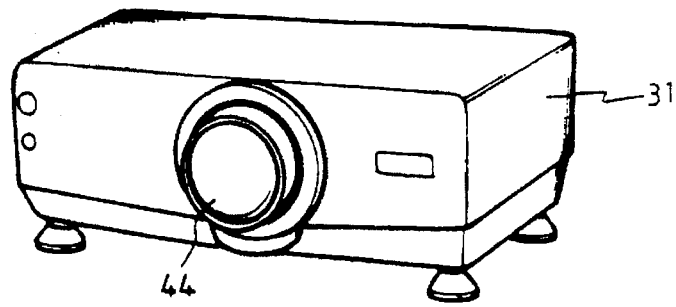
FIG. 3 illustrates a perspective view of a conventional liquid crystal display type projector.
Figure 4:
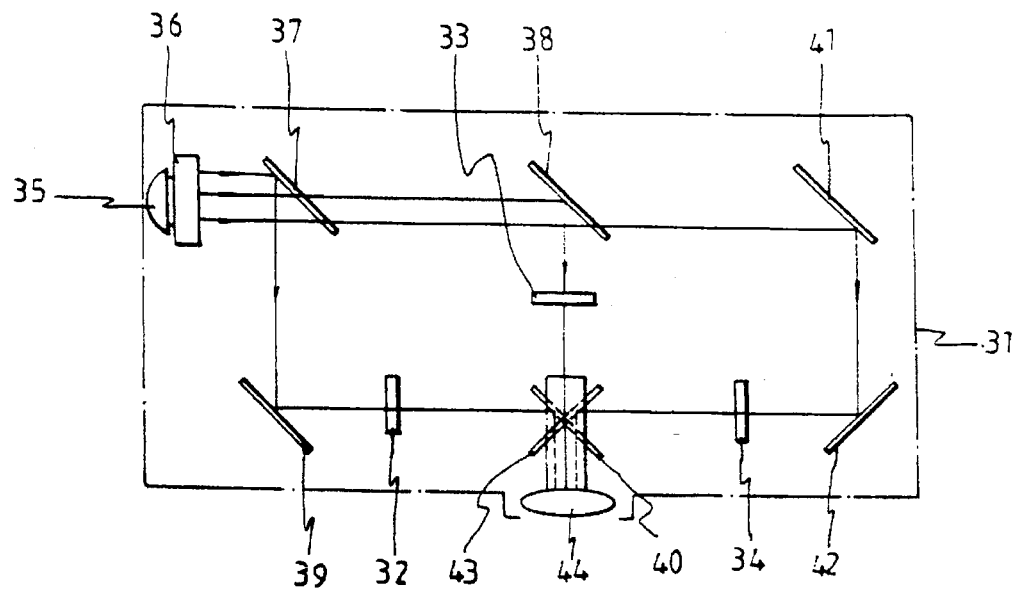
FIG. 4 illustrates an optical system of the conventional liquid crystal display type projector shown in FIG. 3.
Figure 5:
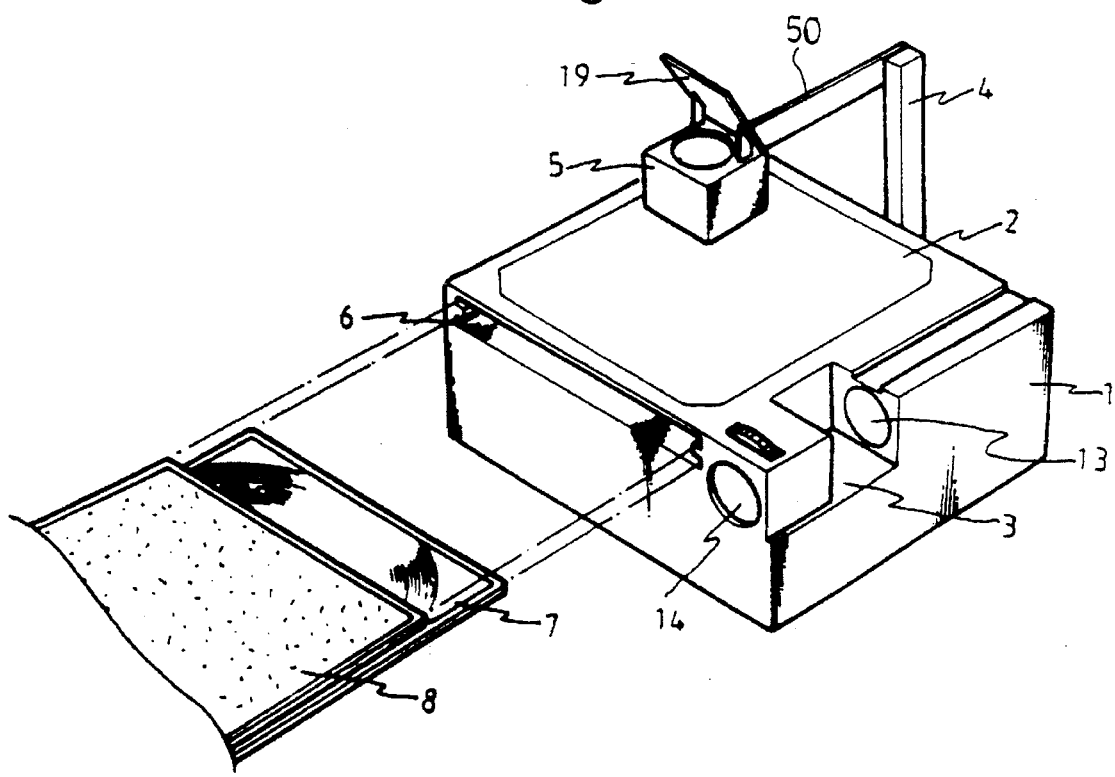
FIG. 5 illustrates a perspective view of a multipurpose projector having a detachable projecting unit in accordance with one preferred embodiment of the present invention.
Figure 6:
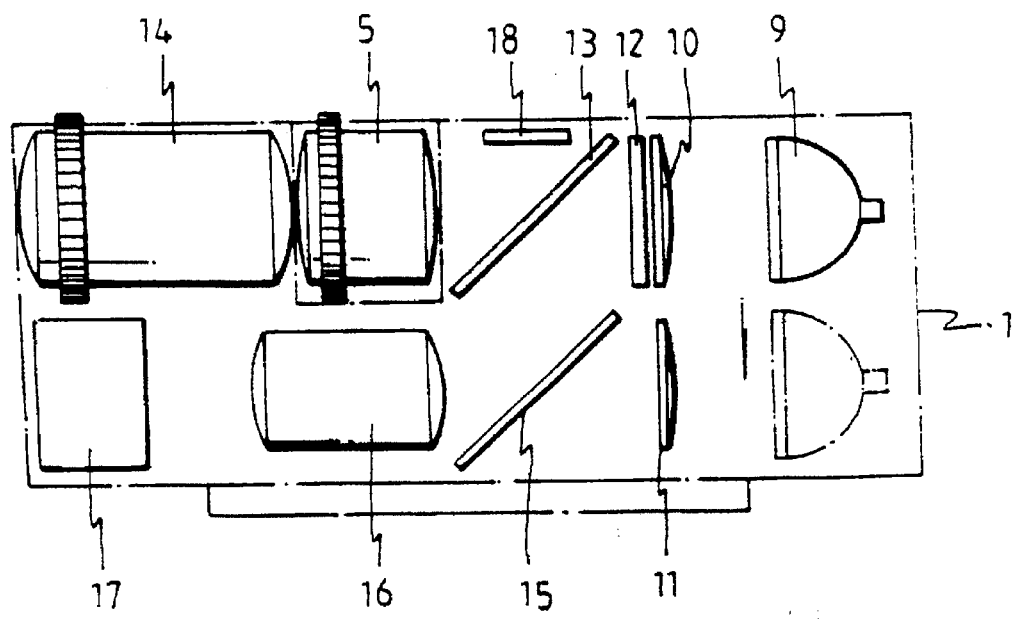
FIG. 6 illustrates a longitudinal sectional view of the multipurpose projector of FIG. 5 showing principal parts of an optical system thereof.
Figure 7:
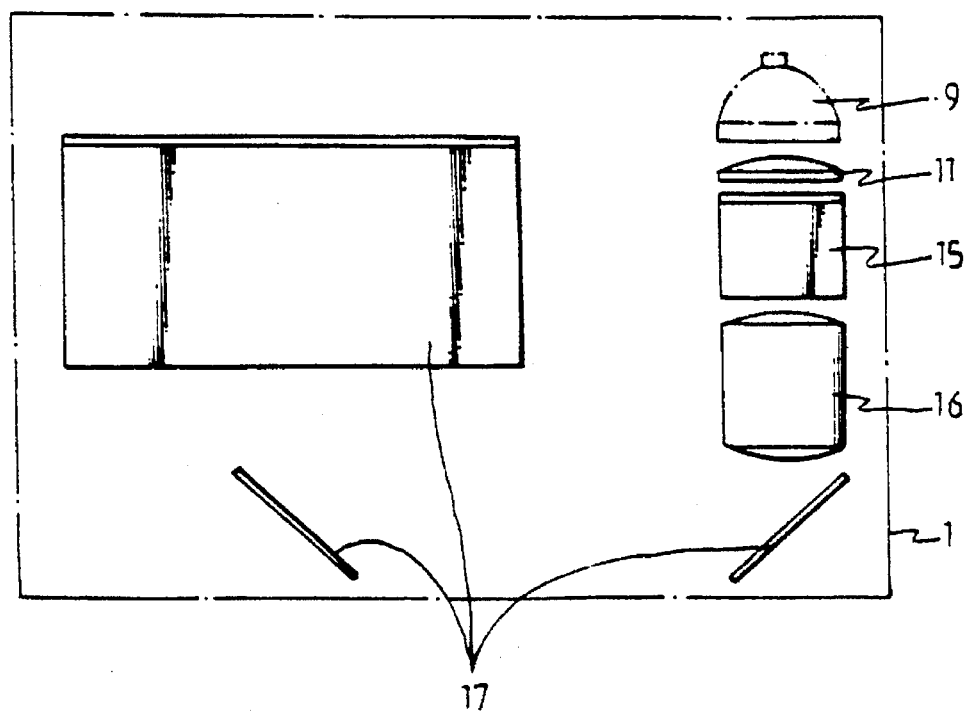
FIG. 7 illustrates a cross sectional view of the multipurpose projector of FIG. 5 showing principal parts of the optical system thereof.

FIG. 5 illustrates a perspective view of a multipurpose projector having a detachable projecting unit in accordance with one preferred embodiment of the present invention, and FIGS. 6 and 7 illustrate a longitudinal, and cross sectional views of the multipurpose projector of FIG. 5 showing principal parts of an optical system thereof.

Referring to FIG. 5, the multipurpose projector having a detachable projecting unit of the present invention has a sheet of transparent glass 2 fixed at the top part of a body 1 and an attaching recess 3.

Further, the multipurpose projector has a rotatable post 4 at a rear side of the body 1, and a projecting unit 5 at the far end of a coupling bar 50 which is connected to the rotatable post 4 at a right angle. The projecting unit 5 has a projecting mirror 19 rotatable in up and down directions on an axis.

Therefore, in case the rotatable post 4 is rotated into a horizontal plane, the projecting unit 5 enters into the attaching recess 3, and in case the rotatable post 4 is rotated into a vertical plane, the projecting unit 5 comes to a position right over the transparent glass 2 of the body 1.

The reason of the projecting unit 5 being rotatably disposed on the rotatable post 4 is that, under an overhead projector function, an image from the transparent film placed on the transparent glass 2 can be diverged and projected by the projecting unit 5 onto the screen only when the rotatable post 4 takes a vertical position to bring the projecting lens 19 in the projecting unit 5 into a position right over the transparent glass 2 attached in the top part of the body 1. And, under an LCD projector function, an image converted into an optical image in the liquid crystal panel 12 can be diverged and projected by the projecting unit 5 onto the screen only when the rotatable post 4 takes a horizontal position to bring the projecting lens 19 in the projecting unit 5 into a position within the attaching recess 3 formed at one side of the body 1.

Guiding grooves 6 in the front side of the body 1 guide mounting of a Fresnel lens 7 or a diverging plate 8.

Referring to aforementioned system and FIG. 6, a light source 9 disposed movably in up and down directions in rear part in the body 1 emits lights, and a first focusing lens 10 in front of the light source 9 on an upper side thereof focuses the light from the light source 9 emitted under a condition that the light source 9 is moved to the upper side.

A second focusing lens 11 under the first focusing lens 10 focuses the light from the light source 9 emitted under a condition that the light source 9 is moved to the under side, and a liquid crystal panel 12 disposed in front of the first focusing lens 10 receives the focused light to convert an electrical image from outside into an optical image.

A first light dividing lens 13 in front of the liquid crystal panel 12 divides the optical image into a horizontal, and vertical images, and a zoom lens 14 in front of the first light dividing lens 13 adjusts the size of the horizontal image that will be diverged and projected by the projecting unit 5.

A second light dividing lens 15 under the first light dividing lens 13 divides both the vertical image divided in the first light dividing lens 13 and the light focused in the second focusing lens 11 in vertical, and horizontal directions again.

A projecting lens 16 in front of the second light dividing lens 15 diverges and projects the image and light divided in a horizontal direction in the second light dividing lens 15, and a plurality of total reflection mirrors 17 on a same horizontal axis with the projecting lens 16 deflects paths of the diverged and projected image and light in the projecting lens 16 to direct them to the transparent glass 2 attached to the body 1.

The image divided in the vertical direction in the second light dividing lens 15 forms an image on an image sensor 18 in upper side of the second light dividing lens 15.

The operation and advantages of the multipurpose projector having detachable projecting unit of the present invention having aforementioned system will be explained with reference to FIGS. 8A to 8D and FIG. 9.

The multipurpose projector of this invention has functions of an OHP, facial LCD projector, back side LCD projector, print copying projection, and image copying projection, all of which functions can be carried out under the control of a main controller 101 on reception of an input from a key signal input unit 102 provided separately in the body 1.

Figure 8A:
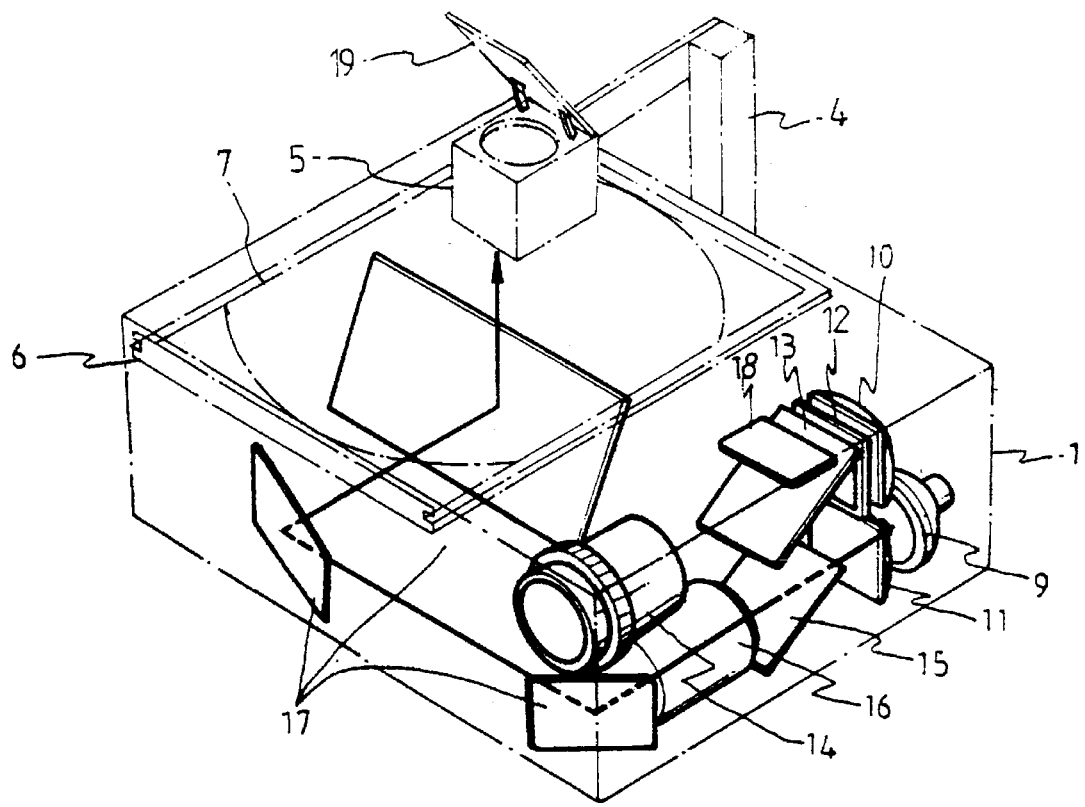
FIG. 8A illustrates the multipurpose projector of the present invention for explaining the way of using an overhead projector part therein.

First, referring to FIG. 8A, the OHP function will be explained.

A transparent film having an image recorded thereon is placed on the transparent glass 2 attached to the upper part of the body 1, the Fresnel lens 7 is inserted into the guide grooves 6 formed in the front surface of the body 1 to mount it in the body 1, and at the same time, the diverging plate 8 is drawn out. Then, an OHP selection button on the key signal input unit 102 is selected to actuate the main controller 101 so that the main controller 101 controls the light source 9 in the rear side in the body 1 to move downward vertically and the rotatable post 4 in the rear side of the body 1 to rotate to an upright position, to bring the projecting unit 5 on the rotatable post 4 to a position right over the transparent glass 2 attached to the upper side of the body 1.

Under this condition, when the light source 9 emits light, the light is focused in the second light focusing lens 11, and divided in a horizontal, and vertical directions by the second light dividing lens 15, and of the divided lights, the horizontal light is diverged by the projecting lens 16, and deflected by the plurality of total reflection mirrors 17 to change its direction from a horizontal direction to a vertical direction. The light having its direction changed into the vertical direction is focused by the Fresnel lens 7 and incident to the transparent glass 2 to project the image in the transparent film placed on the transparent glass 2 to the projecting unit 5, where the image is diverged and enters to the projecting mirror 19, at which the image is reflected to the screen in front of the projecting mirror 19.

Herein, it can be known that the path of light in the OHP function is the light source 9, the second focusing lens 11, the second light dividing lens 15, the projecting lens 16, the plurality of total reflection mirrors 17, the Fresnel lens 7, and the projecting unit 5.

In the meantime, at projection of the image in the transparent film to the screen, it is evident that if a user points a part of the image on the film with a pointer, the image of pointing is also projected.

Figure 8B:
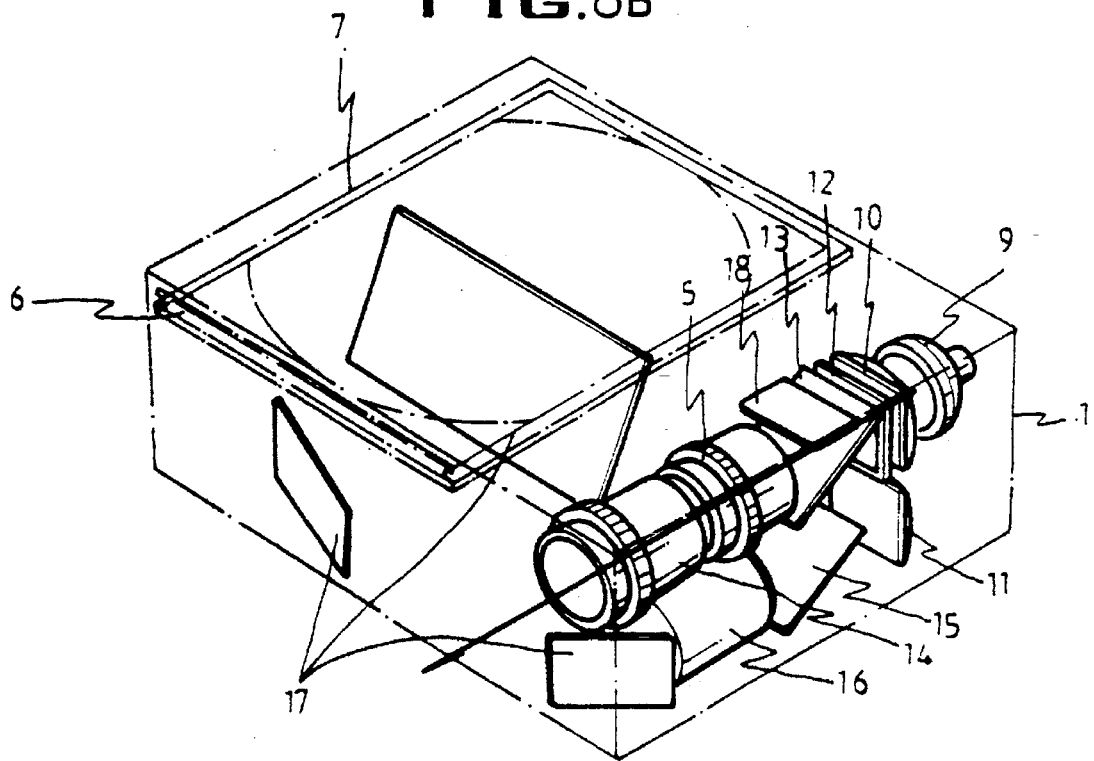
FIG. 8B illustrates the multipurpose projector of the present invention for explaining the way of using the overhead projector part therein as a facial overhead projector.

Next, referring to FIG. 8B, the facial LCD projection function will be explained.

The multipurpose projector of the present invention is connected to a VCR or a computer, and the Fresnel lens 7 is inserted into the guide grooves 6 formed in front side of the body 1 to mount it in the body 1, and on the same time, the diverging plate 8 is drawn out. Then, a facial LCD projector function in the key signal input unit 102 is selected to actuate the main controller 101 so that the main controller 101 controls both the light source 9 in the rear part in the body 1 to move upward vertically, and, on the same time, the rotatable post 4 in the rear of the body 1 to rotate to take a horizontal position, to bring the projecting unit 5 on the rotatable post into the attaching recess 3 formed at one side of the body 1.

Under this condition, when the light source 9 emits light, the emitted light is focused in the first focusing lens 10, incident to the liquid crystal panel 12 to convert electrical image information applied to the liquid crystal panel 12 from an image display, such as the VCR or the computer into optical image information, and divided into a horizontal, and vertical directions by the first light dividing lens 13. Of the divided images, the image in the horizontal direction is diverged by the projecting unit 5, adjusted of the size of the image by the zoom lens 14, and projected onto the screen, thus, the facial LCD projection function is performed.

Herein, it can be known that the path of light in the facial LCD projection function is the light source 9, the first focusing lens 10, the liquid crystal panel 12, the first light dividing lens 13, the projecting unit 5, and the zoom lens 14.

Figure 8C:
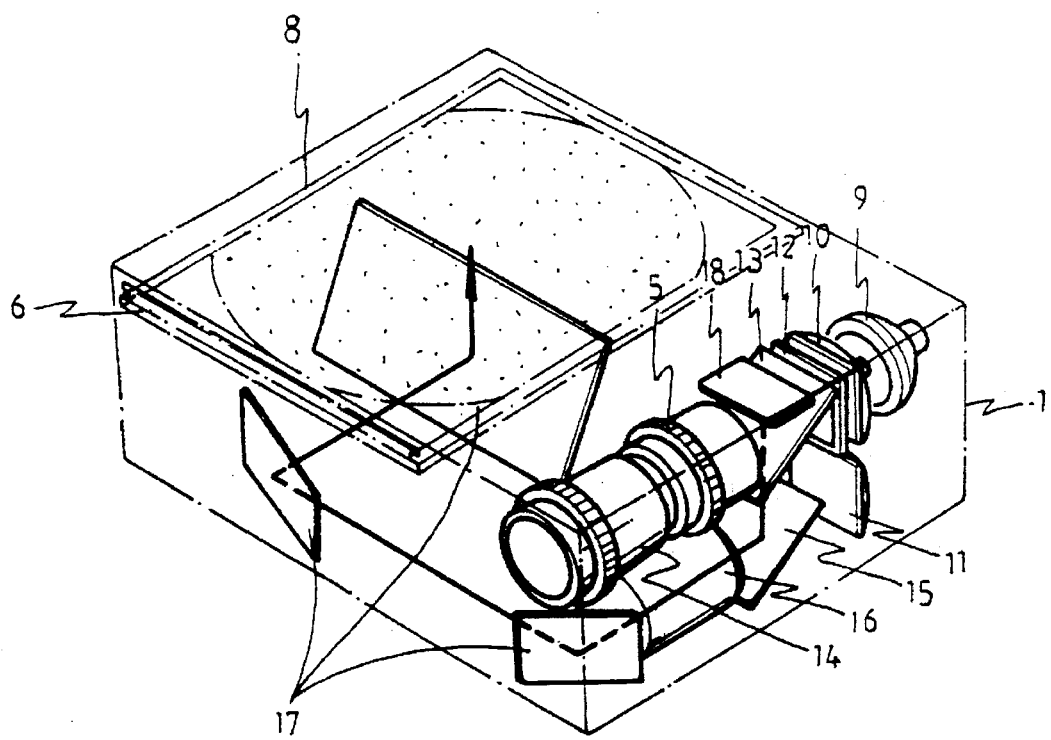
FIG. 8C illustrates the multipurpose projector of the present invention for explaining the way of using the overhead projector part therein as a back side overhead projector.

Opposite to above, referring to FIG. 8C, when the diverging plate 8 is inserted into the guide grooves 6 formed in front side of the body 1 to mount it in the body 1, the Fresnel lens 7 is drawn out from the body 1, and the back side LCD projector function is selected through the key signal input unit 102, the image divided in a vertical direction by the first light dividing lens 13 is divided into a horizontal, and vertical directions by the second light dividing lens 15. Of the divided lights, the image divided in the horizontal direction is diverged by the projecting lens 16, deflected of its path by the plurality of total reflection mirrors 17 from a horizontal direction to a vertical direction, and diverged by the diverging plate 8, thus the back side projection function can be performed.

In other words, it can be known that once a user would select the LCD projector function, both the facial LCD projection function and the back side LCD projection function are possible to perform. In this case, in order to use the facial LCD projector function only, the transparent glass 2 attached to the body 1 simply be covered with a separate cover, and in order to use the back side LCD projector function only, the zoom lens 14 simply be covered with a separate cover from outside.

Herein, it can be known that the path of light in the back side LCD projection function is the light source 9, the first focusing lens 10, the liquid crystal panel 12, the first light dividing lens 13, the second light dividing lens 15, the projecting lens 16, the plurality of total reflection mirrors 17, and the diverging plate 8.

Figure 8D:
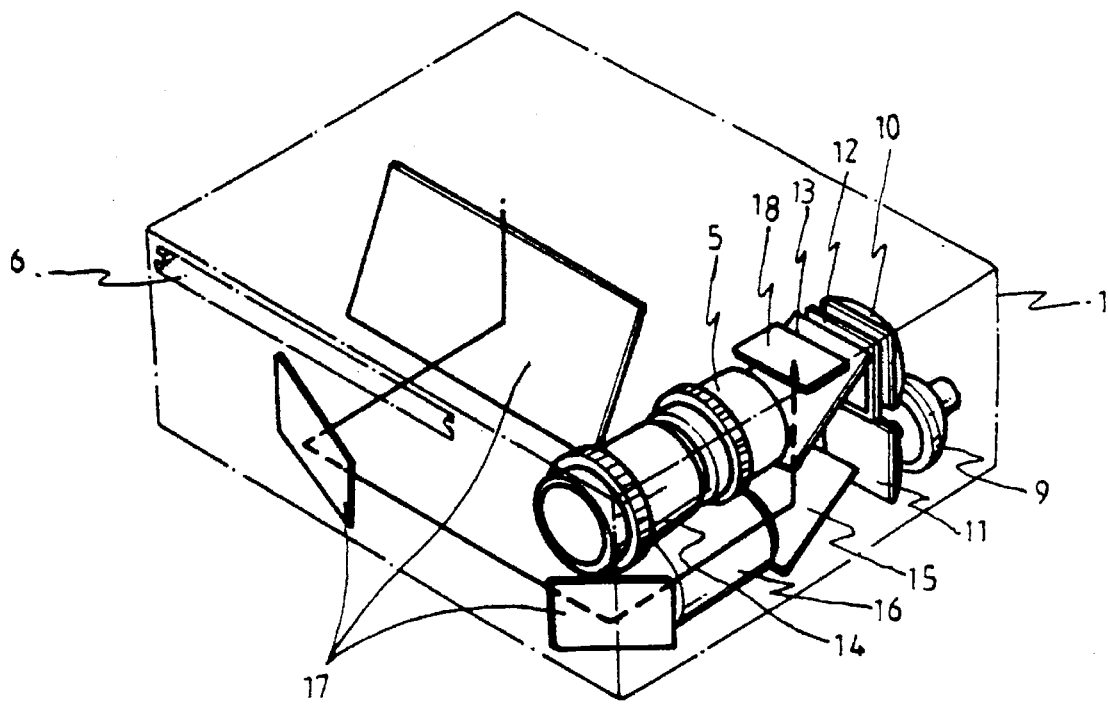
FIG. 8D illustrates the multipurpose projector of the present invention for explaining the way of using it as a print copier.

Referring to FIG. 8D, the print copying projection function will be explained.

A sheet of paper having an image printed thereon to be copied is placed on the transparent glass 2 attached to the upper part of the body 1, and the Fresnel lens 7 and the diverging plate 8 are drawn out of the guiding grooves 6 formed in front side of the body 1. Then, the print copying projection function in the key signal input unit 102 is selected to actuate the main controller 101 so that the main controller controls the light source 9 to move downward vertically.

Under this condition, when the light source 9 emits light, the emitted light, following the same path with the path in the OHP function, incident to the transparent glass 2 projecting an opposite image back to the projecting lens 16, which is then focused therein, and divided in a horizontal direction, and vertical direction by the second light dividing lens 15. The image divided in the vertical direction is divided in a horizontal direction, and vertical direction by the first light dividing lens 13 again, and the image divided in the vertical direction forms an image on the image sensor 18 on an upper side of the first light dividing lens 13, allowing a print copying function. Thus, the image on the printed paper forms its image on the image sensor 18, which is then converted into a digital signal through a video signal converting device 107, and stored in a memory device 105.

In the print copying projector function, since the position of the projecting unit 5 on the rotatable post 4 does not matters at all irrespective of whether it is in the attaching recess 3 formed in the body 1 or it is at the position right over the transparent glass 2 attached to the upper part of the body 1, there is no need to handle the rotatable post 4.

Herein, it can be known that the path of light in the print copying projection function is the plurality of total reflection mirrors 17, the projecting lens 14, the second light dividing lens 15, and the image sensor 18.

Figure 8E:
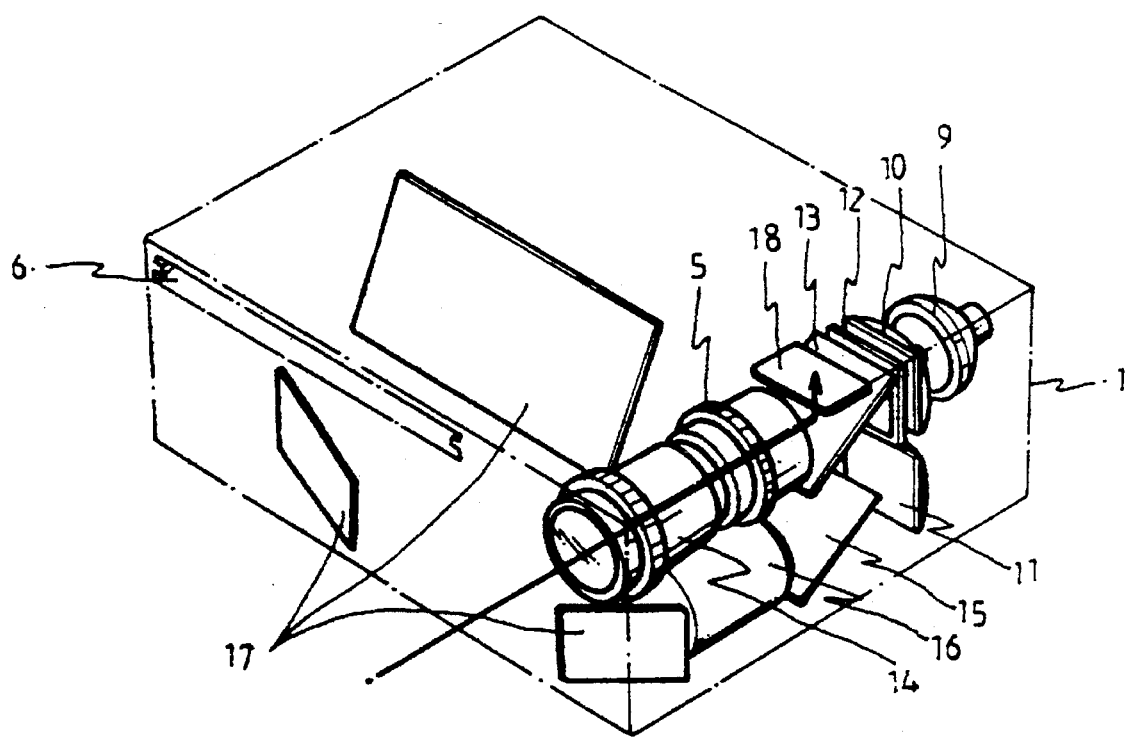
FIG. 8E illustrates the multipurpose projector of the present invention for explaining the way of using it as an image copier.

Finally, referring to FIG. 8E, the image copying projection function will be explained.

On selection of the image copying function in the key signal input unit 102, a light source and projecting unit transfer device 104 is actuated so that the main controller 101 controls the light source 9 to move upward vertically, and the rotatable post 4 in rear side of the body 1 to rotate to a horizontal position, to bring the projecting unit 5 on the rotatable post into the attaching recess 3 formed at one side of the body 1.

Under this condition, when the light source 9 emits light, the emitted light is, following the same path with the path in the facial LCD projector function explained above, projected onto the screen with the image inverted, which inverted image is converged by the projecting unit 5, and then divided in a horizontal, and vertical directions by the first light dividing lens 13. The image divided in the vertical direction forms an image on the image sensor 8 in the upper side of the first light dividing lens, allowing the image copying function. Thus, as shown in FIG. 9, the external image forms its image on the image sensor 106, which is then converted into a digital signal through the video signal converting device 107, and stored in the memory device 105 under the control of the main controller 101. This external image stored in the memory device 105 can be applied to a display 103 on selection of the same by a sub-control unit 111. And, an edition of the external image with an image applied through an image display 109 and the video signal input/output device 108, which edited image can also be stored in the memory device 105 under the control of the main controller 101.

Herein, it can be known that the path of light in the image copying projection function is the external moving pictures, the zoom lens 14, the projecting unit 5, and the image sensor 18.

Likewise, in the image copying function, since the Fresnel lens 7 and the diverging plate 8 are not used, they may be left inserted in the body 1 or drawn out of the body 1 as the occasion calls for.

As has been explained, the multipurpose projector having a detachable projecting unit including: a body having a sheet of transparent glass disposed in the top part thereof and an attaching recess at one side of an optical system region therein; a projecting unit attachable into the attaching recess or disposable right over the transparent glass by means of a rotatable post attached to the body to the option of a user for diverging and projecting moving pictures projected thereto; a liquid crystal display projector part having a light source disposed movably in a vertical direction in rear part of the optical system in the body for emitting lights at a predetermined luminous intensity, a first focusing lens for focusing the light emitted from the light source, a liquid crystal panel for receiving light focused by the first focusing lens for converting an electrical image received from outside into an optical image, and a zoom lens for adjusting size of the optical image converted in the liquid crystal panel; an overhead projector part disposed in the optical system in the body having a second focusing lens for focusing the light emitted from the light source, a plurality of total reflection mirrors for deflecting a path of the light focused by the second focusing lens at a right angle from a horizontal direction to a vertical direction, and a Fresnel lens detachably disposed in the body for focusing the light deflected into the vertical direction at the total reflection mirrors; and an image sensor disposed in the rear part of a projecting lens in the liquid crystal display part for converting a received optical image into an electrical image, allowing a user to carry out multipurpose functions of an OHP which projects a still image onto a screen, an LCD projector which projects moving pictures onto the screen, and even print copying as well as image copying, to the option of a user, the multipurpose projector of this invention has significant advantages of doubling its rate of use, with the consequential improvement in the consumer's economy.

Therefore, with regard to the multipurpose projector having a detachable projecting unit in accordance with one preferred embodiment of the present invention wherein an additional device is required for the downward movement of the light source on the rear side in the body, and another additional device is required for rotating the rotatable post in the rear side of the body, though the rotating post may be rotated by means of the additional device, since it can be adapted to be rotatable by hand, it is evident that the present invention is not limited to the disclosed embodiments, but embraces all other alternatives and variations.

What is claimed is:

1. A multipurpose projector having a detachable projecting unit comprising:
    a body including,
        a sheet of transparent glass at an upper side of the body, and
        an attaching recess which is formed at one side of an optical system region of the body;
    a projecting unit attachable into the attaching recess over the transparent glass by means of a rotatable post attached to the body, in response to a user's option, for diverging and projecting moving pictures;
    a liquid crystal display projector part including,
        a light source disposed movably in a vertical direction in a rear part of the optical system in the body for emitting light at a predetermined luminous intensity,
        a first focusing lens for focusing the light emitted from the light source,
        a liquid crystal panel for receiving light focused by the first focusing lens for converting an electrical image received from outside into an optical image, and
        a zoom lens for adjusting size of the optical image converted in the liquid crystal panel;
    an overhead projector part disposed in the optical system in the body including, a second focusing lens for focusing the light emitted from the light source, a plurality of total reflection mirrors for deflecting a path of the light focused by the second focusing lens at a right angle from a horizontal direction to a vertical direction, and a Fresnel lens detachably disposed in the body for focusing the light deflected into the vertical direction at the total reflection mirrors; and, an image sensor disposed in the rear part of a projecting lens in the liquid crystal display part for converting a received optical image into an electrical image.

2. The multipurpose projector as claimed in claim 1, further comprising:

a first light dividing lens disposed in front of the liquid crystal panel in a system of the liquid crystal display projector part for dividing an image displayed on the liquid display panel in a horizontal, and vertical directions;

a second light dividing lens disposed in front of the second focusing lens in a system of the overhead projector part for dividing the image divided in the vertical direction in the first light dividing lens into a horizontal, and vertical directions again; and, the projecting lens disposed in front of the second light dividing lens for focusing the image divided in the horizontal direction in the second light dividing lens.

3. The multipurpose projector as claimed in claim 1, wherein the projecting unit provided on the rotatable post rotatably provided at the rear side of the body is accommodated into the recess formed in the body when the rotatable post is rotated to a horizontal position and comes to a position right over the transparent glass attached to the body when the rotatable post is rotated to an upright position.

4. The multipurpose projector as claimed in claim 1, wherein the body is provided with guide grooves for detachably mounting the Fresnel lens and a diverging plate in the body by inserting the Fresnel lens and the diverging plate through the guide grooves.

5. The multipurpose projector as claimed in claim 1, wherein the overhead projector function is performed following a path of light from the light source, the second focusing lens, a second light dividing lens, the projecting lens, a plurality of the total reflection mirrors, the Fresnel lens, and the projecting unit.

6. The multipurpose projector as claimed in claim 1, wherein a facial liquid crystal display projection function is performed following a path of light from the source, the first focusing lens, the liquid crystal panel, a first light dividing lens, the projecting unit, and the zoom lens.

7. The multipurpose projector as claimed in claim 1, wherein a back side LCD projection function is performed following a path of light from the light source, the first focusing lens, the liquid crystal panel, a first light dividing lens, a second light dividing lens, the projecting lens, a plurality of the total reflection mirrors, and a diverging plate.

8. The multipurpose projector as claimed in claim 1, wherein a print copying projection function is performed following a path of light from a plurality of the total reflection mirrors, the projecting lens, the second light dividing lens, and the image sensor.

9. The multipurpose projector as claimed in claim 8, wherein a still image formed on the image sensor is stored in a memory device through a video signal converting device and a main controller.

10. The multipurpose projector as claimed in claim 1, wherein an image copying projection function is performed following a path of light from the zoom lens, the projecting unit, and the image sensor.

11. The multipurpose projector as claimed in claim 10, wherein moving pictures formed on the image sensor is stored in a memory device through a video signal converting device and a main controller.

12. The multipurpose projector as claimed in claim 2, wherein the projecting unit provided on the rotatable post rotatably provided at the rear side of the body is accommodated into the recess formed in the body when the rotatable post is rotated to a horizontal position and comes to a position right over the transparent glass attached to the body when the rotatable post is rotated to an upright position.

13. The multipurpose projector as claimed in claim 2, wherein the body is provided with guide grooves for detachably mounting the Fresnel lens and a diverging plate in the body by inserting the Fresnel lens and the diverging plate through the guide grooves.

14. The multipurpose projector as claimed in claim 1, wherein the projecting unit can be perpendicularly disposed over the transparent glass in response to the user's option.

* * * * *